US011862137B2

(12) United States Patent
Chang et al.

(10) Patent No.: US 11,862,137 B2
(45) Date of Patent: Jan. 2, 2024

(54) DEVICE FOR REDUCING VIBRATION

(71) Applicants: Hyundai Motor Company, Seoul (KR); Kia Corporation, Seoul (KR)

(72) Inventors: Kyoung-Jin Chang, Gyeonggi-do (KR); Sangjin Hong, Gyeonggi-do (KR); Dong Chul Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 206 days.

(21) Appl. No.: 17/494,575

(22) Filed: Oct. 5, 2021

(65) Prior Publication Data

US 2022/0301534 A1 Sep. 22, 2022

(30) Foreign Application Priority Data

Mar. 16, 2021 (KR) ........................ 10-2021-0033962

(51) Int. Cl.
*G10K 11/172* (2006.01)

(52) U.S. Cl.
CPC .................................. *G10K 11/172* (2013.01)

(58) Field of Classification Search
CPC . B60R 13/08; B60R 13/0815; B60R 13/0823; B60R 13/083; B60R 13/0838;
(Continued)

(56) References Cited

U.S. PATENT DOCUMENTS 2,541,159 A * 2/1951 Geiger ...................... E04B 1/84 181/208
4,373,608 A * 2/1983 Holmes ..................... F16F 7/10 181/208
(Continued)

FOREIGN PATENT DOCUMENTS

CN 111091804 A * 5/2020
CN 112259066 A * 1/2021
(Continued)

OTHER PUBLICATIONS

Web archive of Wikipedia page for Scotch Tape, Apr. 13, 2019, <https://web.archive.org/web/20190413063448/https://en.wikipedia.org/wiki/Scotch_Tape> (Year: 2019).*
(Continued)

*Primary Examiner* — Jeremy A Luks
(74) *Attorney, Agent, or Firm* — Fox Rothschild LLP

(57) ABSTRACT

A vibration reducing device is attached to a structure and blocks sound transmitted through the structure. The vibration reducing device includes a unit structure having a target frequency band, the unit structure including a plurality of unit cells, each formed of an acoustic meta-material and having a different target frequency, the unit cells being connected through first bridges; and a predetermined number of unit structures being connected through second bridges and attached to the structure, where each of the unit cells comprises: a mass portion of which a size is set according to the target frequency; a base frame formed as a quadrangular frame, the mass portion being eccentrically disposed in the base frame; and a support portion that connects the mass portion and the base frame, the support portion having a size that is set according to the target frequency.

9 Claims, 5 Drawing Sheets

(58) Field of Classification Search
CPC . B60R 13/0884; G10K 11/162; G10K 11/172
See application file for complete search history.

(56) References Cited

U.S. PATENT DOCUMENTS

| | | | | |
|---|---|---|---|---|
| 8,616,330 | B1 * | 12/2013 | McKnight | B60R 13/08 181/207 |
| 10,854,183 | B2 * | 12/2020 | Yamazoe | G10K 11/16 |
| 2016/0027427 | A1 * | 1/2016 | Yang | G10K 11/172 181/286 |
| 2019/0120316 | A1 * | 4/2019 | Chang | F16F 7/104 |
| 2019/0333495 | A1 * | 10/2019 | Lee | G10K 11/22 |
| 2020/0143784 | A1 * | 5/2020 | Huang | G10K 11/172 |
| 2020/0180523 | A1 | 6/2020 | Chang et al. | |

FOREIGN PATENT DOCUMENTS

| | | | | | |
|---|---|---|---|---|---|
| CN | 112365871 | A | * | 2/2021 | |
| KR | 2013021055 | A | * | 3/2013 | B63B 15/00 |
| KR | 2019-0045591 | A | | 5/2019 | |
| KR | 2019-0053667 | A | | 5/2019 | |
| KR | 2020-0069926 | A | | 6/2020 | |

OTHER PUBLICATIONS

English translation of CN-112365871-A, accessed Jun. 23, 2023 via Espacenet <https://translationportal.epo.org/emtp/translate/?ACTION=description-retrieval&COUNTRY=CN&ENGINE=google&FORMAT=docdb&KIND=A&LOCALE=en_EA&NUMBER=112365871&OPS=ops.epo.org/3.2&SRCLANG=zh&TRGLANG=en> (Year: 2021).*

Claeys et al., "A lightweight vibro-acoustic metamaterial demonstrator—Numerical and experimental investigation", Mechanical System and Signal Processing 70-71 (2016) 853-880.

Chang et al., "Design and validation of metamaterials for multiple structural stop bands in waveguides", Extreme Mechanical Letters 2016.

Claeys et al., "A study on the application of locally resonant acoustic metamaterial for reducing a vehicle s engine noise", MADRID, Inter noise 2019, RessearchGate, Conference paper Jun. 2019, 13 pages.

* cited by examiner

DEVICE FOR REDUCING VIBRATION

CROSS-REFERENCE TO RELATED APPLICATION

This application claims under 35 U.S.C. § 119 the benefit of Korean Patent Application No. 10-2021-0033962 filed in the Korean Intellectual Property Office on Mar. 16, 2021, the entire contents of which are incorporated herein by reference.

BACKGROUND

(a) Technical Field

The present disclosure relates to a vibration reduction device, more particularly, to the vibration reducing device that can efficiently reduce vibration and noise transmitted through a structure.

(b) Description of the Related Art

In a vehicle, it is increasingly difficult to reduce noise vibration due to specifications that require weight reduction of the vehicle and increased engine excitation force due to fuel efficiency requirements and output improvements.

Accordingly, there is a need for structural improvements in the vehicle that can robustly improve noise-vibration-harshness (NVH) performance of the vehicle.

Meanwhile, a dash panel is disposed between an engine compartment of the vehicle and a driver's seat, and a floor panel forming an interior floor surface is disposed from a lower end of the dash panel to a rear side of a vehicle body.

When accelerating in a vehicle, sound transmitted through the dash panel is an important consideration to improve the NVH performance of the vehicle.

Conventionally, a method for blocking noise transmitted from the engine compartment and load noise transmitted from the ground includes increasing a thickness of the dash panel, increasing a curved surface, or adding a reinforcement member or vibration damper.

While the above-described method for reducing vibration of the vehicle body has a noise improvement effect, there are many limitations such as an increase in manufacturing cost and an increase in vehicle weight.

Therefore, there is a need for a new method to reduce noise inflow from the exterior of the vehicle or the engine compartment to the interior of the vehicle.

The above information disclosed in this Background section is only for enhancement of understanding of the background of the disclosure, and therefore it may contain information that does not form the prior art that is already known in this country to a person of ordinary skill in the art.

SUMMARY

An embodiment of the present disclosure provides a vibration reducing device that can block vibration transmitted from a structure by selectively attaching to the structure through which the vibration is transmitted.

A vibration reducing device according to one or a plurality of embodiments of the present disclosure is attached to a structure and blocks sound transmitted through the structure. The vibration reducing device includes a unit structure having a target frequency band, the unit structure including a plurality of unit cells, each formed of an acoustic metamaterial and having a different target frequency, the unit cells being connected through first bridges; and a predetermined number of unit structures being connected through second bridges and attached to the structure, wherein each of the unit cells comprises: a mass portion of which a size is set according to the target frequency; a base frame formed as a quadrangular frame, the mass portion being eccentrically disposed in the base frame; and a support portion that connects the mass portion and the base frame, the support portion having a size that is set according to the target frequency.

In addition, the mass portion may be formed in a shape of a quadrangular block.

In addition, the mass portion may be set to be increased in size as the target frequency is decreased to increase a vibration reduction amount.

In addition, the mass portion may be disposed at a predetermined distance upwardly from an upper surface of the base frame.

In addition, the mass portion may include an engraving portion for numbering on the upper surface.

In addition, the support portion may connect the mass portion and the base frame, and may be disposed in a direction in which the respective unit cells forming the unit structure inwardly face each other In addition, the support portion may be fixed to one side of an upper surface of the base frame through a protruded first fixing portion provided at one end, a connecting portion may be integrally extended at a position spaced from the first fixing portion by a certain height, and the support portion may be connected to a center of one side of the mass portion through a second fixed portion formed integrally with the connecting portion at an opposite end.

In addition, a variable groove may be formed in a center portion of the connecting portion, and the support portion may adjust the entire length by changing a size of the variable groove.

In addition, the first bridge may be formed in a hemispherical ring shape, and a plurality of first bridges may be connected between base frames of the unit cells that form the unit structure.

In addition, the second bridge may be formed in a hemispherical ring shape, and may connect between one base frame set among base frames of unit cells that form one unit structure, and another base frame of an adjacent unit structure.

In addition, an adhesive member may be attached to a rear surface of the base frame and thus attached to the structure.

The vibration reducing device according to the embodiment of the present disclosure can be selectively attached to a specific structure to effectively block the vibration transmitted through the structure.

In addition, the vibration reducing device according to the embodiment of the present disclosure has an effect that can be applied regardless of the type and state of the structure.

In addition, the effects that can be obtained or predicted by the embodiment of the present disclosure will be disclosed directly or implicitly in the detailed description of the embodiment of the present disclosure. That is, various effects predicted according to an embodiment of the present disclosure will be disclosed within a detailed description to be described later.

DETAILED DESCRIPTION OF THE EMBODIMENTS

Figure 1:
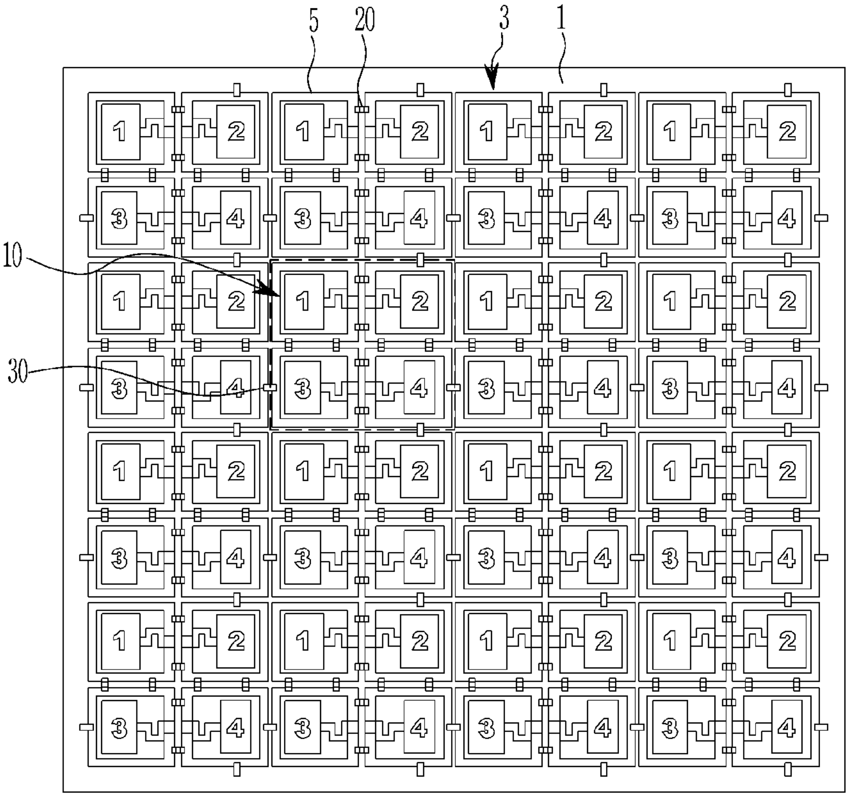
FIG. 1 is a schematic diagram of a vibration reducing device according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

The drawings and description are to be regarded as illustrative in nature and not restrictive, and throughout the specification, the same or similar constituent elements are explained by applying the same reference numeral.

In the following description, dividing names of components into first, second, and the like is to divide the names because the names of the components are the same as each other, and an order thereof is not particularly limited.

A vibration reduction device according to an embodiment of the present disclosure is configured to reduce noise transmitted through structures in various industrial fields such as vehicles, aircraft, home appliances, and mechanical structures.

That is, noise generated from engines or motors in vehicles, aircraft, home appliances, and mechanical structures is transmitted through air or through structures.

Accordingly, a vibration reduction device according to an embodiment of the present disclosure is attached to a structure and can be applied to reduce the noise transmitted through the structure.

For example, the structure may be an inner panel or a support of an electronic product such as a washing machine, a refrigerator, a dishwasher, a microwave oven, an air conditioner, or a hot air fan.

In addition, the structure may be a support or reinforcement for supporting a soundproof wall of a road or a rainwater drain pipe of a building, and may be a device for performing milling, cutting, extrusion, and molding.

In addition, the structure may be a support or housing of rotation equipment such as a pump, compressor, and turbine of a power plant, or a support of a computer hard disk.

In particular, the structure applied in the vehicle industry may be a roof panel as a part of the vehicle body, and may be a top panel disposed on the upper side of the cowl of an engine room.

In addition, it can be applied not only to the part where vibration and noise are transmitted from the vehicle body, but also to all devices where vibration and noise are transmitted.

In addition, the vibration reduction device according to the embodiment of the present disclosure is formed of an acoustic meta-material having an acoustic meta-structure, and the acoustic meta-material refers to a structure that is artificially designed to have a unique wave characteristic that cannot be found in nature.

That is, unlike materials existing in nature, the acoustic meta-material refers to a medium having a zero or negative dielectric constant or a negative refractive index.

By periodically arranging unit cells smaller than a wavelength, the acoustic meta material can block propagation of waves by making the mass density or volumetric elastic modulus a negative value in a specific frequency band.

In this case, a band in which a wavenumber corresponding to a specific frequency is empty occurs due to a local resonance effect.

Such a band in which the frequency is empty is called a stop band, and theoretically, since there is no wave propagating in the stop band, the wave propagation can be completely blocked.

That is, the unit cell is designed based on the stop band.

FIG. 1 is a schematic diagram of a vibration reducing device according to an embodiment of the present disclosure.

Referring to FIG. 1, a plurality of unit cells 10 formed of an acoustic meta material are disposed to form a unit structure 5, and by attaching the unit structure 5 to a structure 1, noise and vibration transmitted from the structure 1 can be reduced.

In this case, the unit cell 10 may be connected in plural through first bridges 20 such that a single unit structure 5 is formed.

In addition, unit structure 5 may be attached to the structure 1 to reduce vibration, and further, the unit structure 5 may be attached to other unit structure(s) by being connected to each other through second bridges 30.

Figure 2:
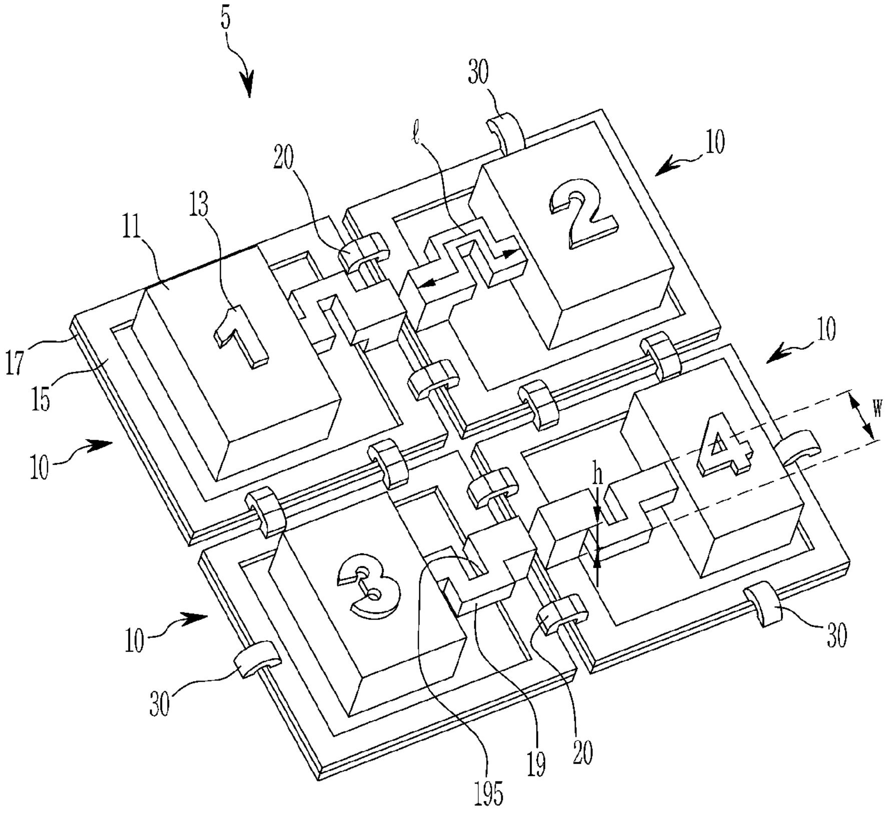
FIG. 2 is a perspective view of a unit structure applied to a vibration reducing device of the according to the embodiment of the present disclosure.
Figure 3:
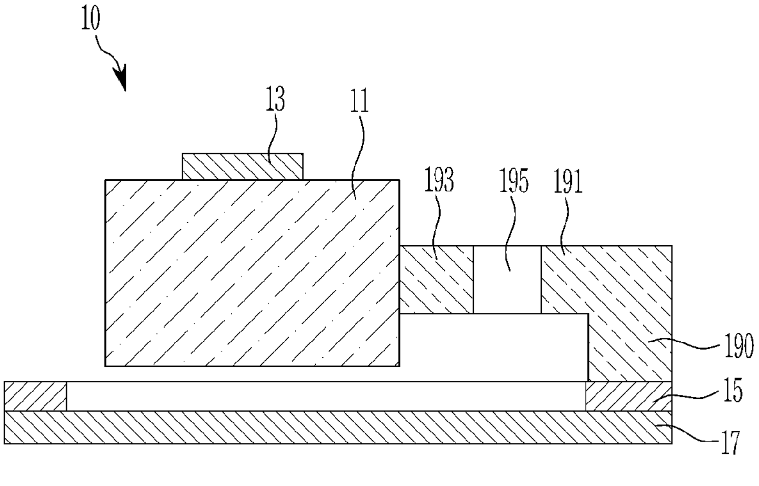
FIG. 3 is a cross-sectional view of a unit cell applied to the vibration reducing device according to the embodiment of the present disclosure.

FIG. 2 is a perspective view of a unit structure applied to a vibration reducing device of the according to the embodiment of the present disclosure, and FIG. 3 is a cross-sectional view of a unit cell applied to the vibration reducing device according to the embodiment of the present disclosure.

Referring to FIG. 2, the unit structure 5 applied to a vibration reducing device 3 according to the embodiment of the present disclosure may be formed of four unit cells 10 connected to each other.

The unit structure 5 may be formed by disposing four unit cells 10 symmetrically in all directions.

Although the unit structure 5 has been described as an example in which four unit cells 10 are connected to each other, it is not necessarily limited thereto, and the number of unit cells 10 may be set within a range from two to eight as needed, and it is advantageous to set it to even numbers.

In the embodiment of the present disclosure, a reference direction is set in the left, right, front, rear, and vertical directions based on FIG. 2, and a portion facing upward is defined as an upper portion, an upper end, an upper surface, and an upper end portion, and a portion facing downward is defined as a lower portion, a lower end, a lower surface, and a lower end portion.

The definition of the reference direction as described above is a relative meaning, and since the direction may vary depending on the reference position of the vibration reducing device 3 or the reference position of assembled parts, the reference direction is not necessarily limited to the reference direction of the present embodiment.

Referring to FIG. 3, the unit cell 10 forming the unit structure 5 includes a mass portion 11, a base frame 15, and a support portion 19.

The mass portion 11 may be formed in a rectangular block shape.

For example, the mass portion 11 may have a rectangle shape.

A size of the mass portion 11 may be set according to a target frequency.

For example, the size of the mass portion 11 increases as the target frequency decreases.

Similarly, the size of the mass portion 11 decreases as the target frequency band increases.

Since the mass portion 11 can increase the amount of vibration reduction as its size increases, the size increases as the target frequency decreases.

The mass portion 11 includes an engraving portion 13 for numbering on the upper surface.

That is, the engraving unit 13 is for numbering each unit cell constituting a single unit assembly.

In addition, the base frame 15 may be formed as a square frame.

The mass portion 11 is eccentrically disposed in the base frame 15.

An adhesive member 17 is formed on the lower surface of the base frame 15 and can be attached to the structure 1.

The adhesive member 17 may include an adhesive or adhesive tape.

It is advantageous that the base frame 15 is formed to secure a gap of at least 1 mm from the outside of the mass portion 11.

In addition, the support portion 19 is disposed to connect the mass portion 11 and the base frame 15.

The support portion 19 is formed of a first fixing portion 190 with one end protruding.

The support portion 19 is fixed to one side of the upper surface of the base frame 15 through the first fixing portion 190.

In addition, the support portion 19 is formed integrally with a connecting portion 191 at a position spaced apart from the first fixing portion 190 by a predetermined height.

The support portion 19 is connected to a center of one side of the mass portion 11 through the connecting portion 191 and a second fixing portion 193 integrally formed at an opposite end.

The support portion 19 defines a portion connecting between the one end and the opposite end as a length 1, and a direction intersecting with respect to the length 1 is defined as a width w.

In addition, the support portion 19 has a variable groove 195 is formed in the central portion of the connecting portion 191.

The support portion 19 can adjust the entire length 1 by changing the size of the variable groove 195 according to the target frequency.

That is, when the variable groove 195 is formed to be small, the entire length 1 of the support portion 19 is shortened, and when the variable groove 195 is formed to be large, the entire length 1 of the support portion 19 is increased.

The support portion 19 is formed to vibrate together with the mass portion 11 while one end is fixed to the base frame 15 when the mass portion 11 is vibrating.

The above-described support portion 19 has a wider width w as the target frequency band is higher.

The support portion 19 connects the mass portion 11 and the base frame 15, but in each unit cell 10 forming the unit structure 5, it is advantageous to be disposed in an inwardly facing direction, respectively.

For example, a first mass portion 11*a* and a second mass portion 11*b* are eccentrically disposed on the inside of each base frame 15, each of the support portion 19 is connected to the inside facing each other, and each mass portion 11*a* and 11*b* is disposed eccentrically through the support portion 19.

Similarly, a third mass portion 11*c* and a fourth mass portion 11*d* are eccentrically disposed on the inside of each base frame 15, each of the support portion 19 is connected to the inside facing each other, and each of the mass portions 11*c* and 11*d* is eccentrically disposed through the support portion 19.

The respective positions of the mass portion 11 and the support portion 19 may vary according to the number of the unit cells 10.

Meanwhile, the unit cell 10 is connected to a predetermined number through the first bridge 20 to form the unit structure 5.

A plurality of the first bridges 20 may be connected between each base frame 15 of the unit cell 10 forming the unit structure 5.

For example, every two first bridges 20 may be disposed on the base frame 15 of the adjacent unit cell 10 forming the unit structure 5 to connect each unit cell 10.

Such a first bridge 20 may be formed in a hemispherical ring shape.

Since the first bridge 20 affects the vibration of the unit cell 10, it is advantageous to make its size as small as possible.

In addition, the first bridge 20 is advantageously made of a flexible material.

That is, the first bridge 20 is made of a material that can be bent such that it can be attached to a curved surface while binding the four unit cells 10 as a set.

In addition, the unit structure 5 may be connected to a predetermined number through the second bridge 30 and attached to the structure 1.

The second bridge 30 connects one predetermined base frame 15 of each base frame 15 of the unit cell 10 that forms one unit structure 5 and one predetermined base frame 15 of another adjacent unit structure 5.

Such a second bridge 30 may be formed in a hemispherical ring shape.

The second bridge 30 is formed to be cuttable when necessary, and is for attaching a plurality of unit structures 5 to the structure 1 at once by interconnecting a plurality of unit structures 5.

In addition, the second bridge 30 connects between the unit structures 5 such that the number of the unit structures 5 can be adjusted according to the area to be attached.

In addition, it is advantageous that the second bridge 30 is made of a flexible material that can respond to a curved surface.

In the vibration reducing device 3, when the frequency of structure 1 is 500 Hz, a target frequency band is set with ±50 Hz such that four unit cells 10 can be set to have an effect between 450 Hz and 550 Hz or less.

For example, the vibration reducing device 3 forms one unit structure 5 by tuning the four unit cells 10 to have target frequencies of 460 Hz, 490 Hz, 520 Hz, and 540 Hz, respectively, and a predetermined number of unit structures 5 can be attached to the structure 1.

In this case, when six unit cells 10 are applied to the vibration reducing device 3, one unit structure can be formed by tuning the respective unit cells 10 to have target frequencies of 450 Hz, 470 Hz, 490 Hz, 510 Hz, 530 Hz, and 550 Hz.

Accordingly, the target frequency band is set according to a frequency of the structure 1 to be reduced, the number of the unit cells 10 is set, and a target frequency of the unit cells 10 can be set according to the number of unit cells 10 compared to the target frequency band.

Figure 4:
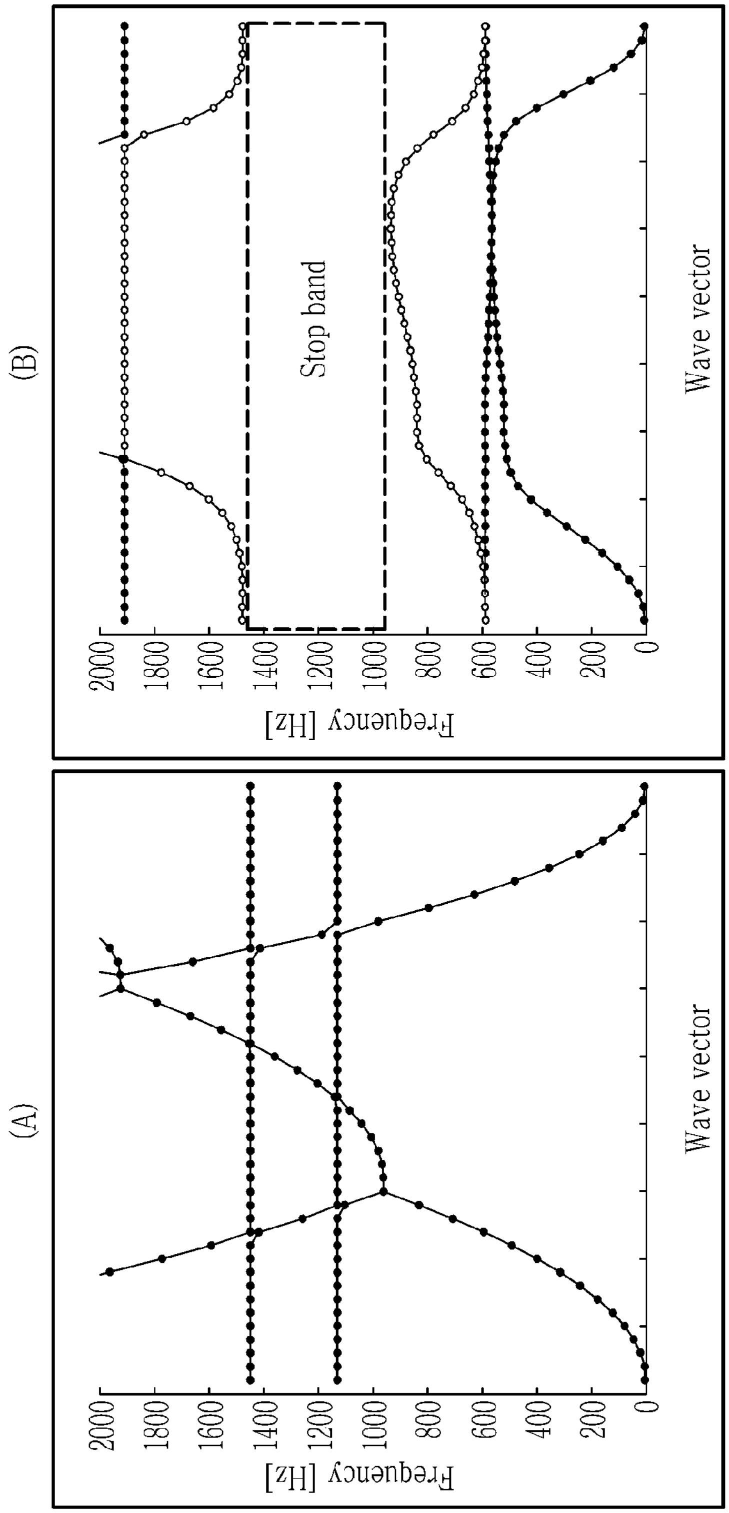
FIG. 4 is a graph illustrating a dispersion relationship between a wave vector and a frequency of the vibration reducing device according to the embodiment of the present disclosure.

FIG. 4 is a graph illustrating a dispersion relationship between a wave vector and a frequency of the vibration reducing device according to the embodiment of the present disclosure.

The vibration reducing device 3 formed as described above can be interpreted through a wave dispersion relationship that is a relationship between a wave number and a frequency characteristic of the wave.

Referring to FIG. 4, a general structure A and a structure B to which the vibration reducing device 3 according to the embodiment of the present disclosure are compared.

The X axis represents a wave vector according to a position of the unit cell 10, and the Y axis represents a frequency.

The dispersion relationship of a general structure has a corresponding wave number in all frequency bands (A).

That is, in a general structure, waves can be transmitted in all frequency bands.

However, it can be determined that the structure 1 to which the vibration reduction device 3 according to the embodiment of the present disclosure is attached generates a band (stop band) in which a wave number corresponding to a frequency is empty due to a local resonance effect (B).

Since it is interpreted that there is no wave that can propagate theoretically in such a stop band, transmission of noise and vibration can be prevented by completely blocking the wave propagation.

Figure 5:
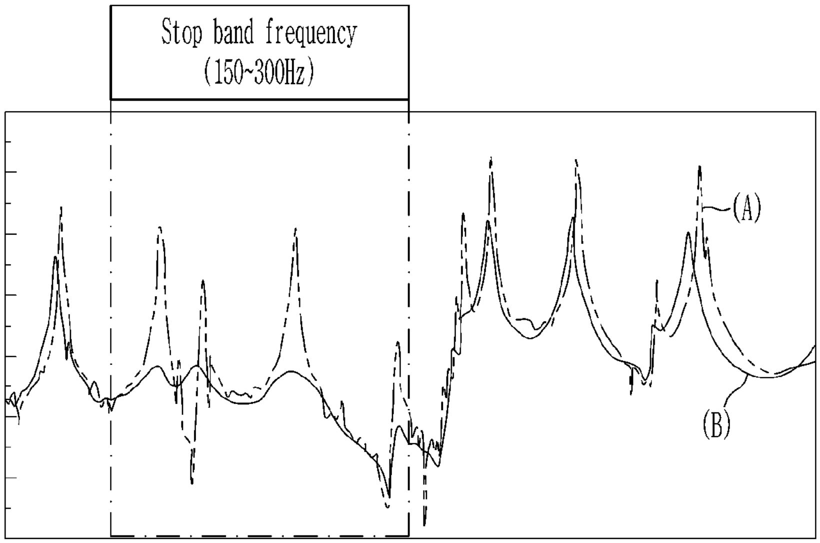
FIG. 5 is a graph showing a vibration response of the vibration reducing device according to the embodiment of the present disclosure measured by an acceleration system.

FIG. 5 is a graph showing a vibration response of the vibration reducing device according to the embodiment of the present disclosure measured by an acceleration system.

The graph of FIG. 5 shows a vibration response of the structure measured by an acceleration system while applying vibration with an impact hammer after attaching the vibration reducing device 3 according to the embodiment of the present disclosure to the structure 1.

Referring to FIG. 5, compared to the general structure A, it can be determined that vibration of a structure B to which the vibration reducing device 3 according to the embodiment of the present disclosure is attached is significantly reduced in the stop band (150 Hz to 300 Hz).

Therefore, the vibration reducing device 3 according to the embodiment of the present disclosure can effectively reduce vibration and noise transmitted through the structure 1.

In addition, the vibration reducing device 3 according to the embodiment of the present disclosure is applicable regardless of the type and state of the structure 1 by adjusting the number of unit structures 5.

For example, the vibration reducing device 3 has a benefit in that it can be attached to a curved panel.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A vibration reducing device that is attached to a structure and blocks sound transmitted through the structure, the vibration reducing device comprising:

a unit structure having a target frequency band, the unit structure including a plurality of unit cells, each formed of an acoustic meta-material and having a different target frequency, the unit cells being connected through first bridges; and a predetermined number of unit structures being connected through second bridges and attached to the structure, wherein each of the unit cells comprises:

a mass portion of which a size is set according to the target frequency;

a base frame formed as a quadrangular frame, the mass portion being eccentrically disposed in the base frame; and a support portion that connects the mass portion and the base frame, the support portion having a size that is set according to the target frequency, wherein the support portion is fixed to one side of an upper surface of the base frame through a protruded first fixing portion provided at one end, a connecting portion is integrally extended at a position spaced from the first fixing portion by a certain height, and the support portion is connected to a center of one side of the mass portion through a second fixed portion formed integrally with the connecting portion at an opposite end, and wherein the support portion has a variable groove in a center portion of the connecting portion, and a length of the support portion is set depending on a size of the variable groove according to the target frequency.

2. The vibration reducing device of claim 1, wherein the mass portion is formed in a shape of a quadrangular block.

3. The vibration reducing device of claim 2, wherein the mass portion is set to be increased large in size as the target frequency is low to increase a vibration reduction amount.

4. The vibration reducing device of claim 1, wherein the mass portion is disposed at a predetermined distance upwardly from an upper surface of the base frame.

5. The vibration reducing device of claim 4, wherein the mass portion comprises an engraving portion for numbering on the upper surface.

6. The vibration reducing device of claim 1, wherein the support portion connects the mass portion and the base frame, and is disposed in a direction in which the respective unit cells forming the unit structure inwardly face each other.

7. The vibration reducing device of claim 1, wherein the first bridge is formed in a hemispherical ring shape, and a plurality of first bridges are connected between base frames of the unit cells that form the unit structure.

8. The vibration reducing device of claim 1, wherein the second bridge is formed in a hemispherical ring shape, and connects between one base frame set among base frames of unit cells that form one unit structure, and another base frame of an adjacent unit structure.

9. The vibration reducing device of claim 1, wherein an adhesive member is attached to a rear surface of the base frame and thus attached to the structure.

* * * * *